Figure 1:
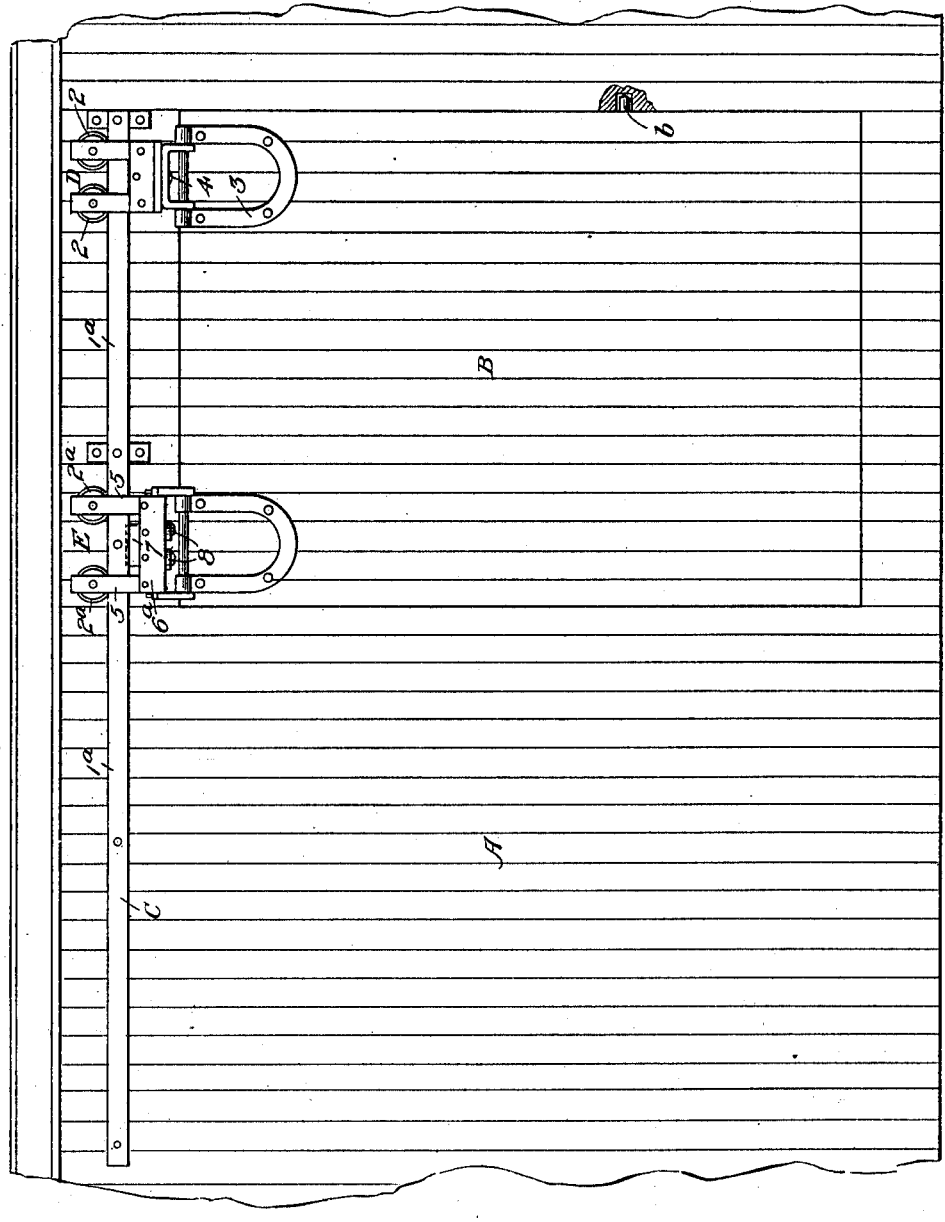

F. B. HOUSER.
FLUSH CLOSING DOOR.
APPLICATION FILED SEPT. 14, 1909.

970,337.

Patented Sept. 13, 1910.
2 SHEETS—SHEET 1.

Witnesses
Edwin L. Bradford
G. P. Ritter

Inventor
Frank B. Houser
By F. W. Ritter Jr.
Attorney

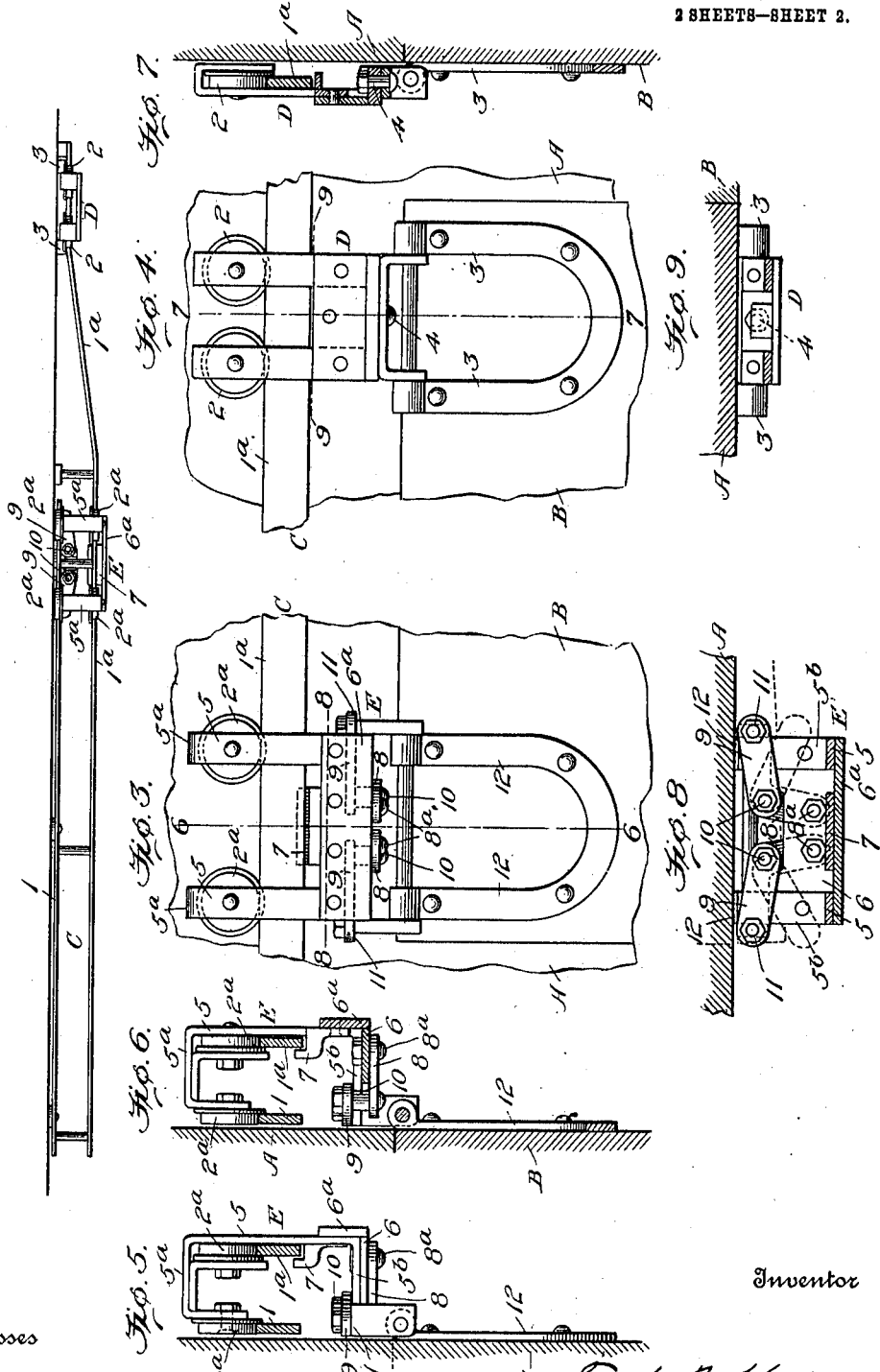

UNITED STATES PATENT OFFICE.

FRANK B. HOUSER, OF LANCASTER, OHIO.

FLUSH-CLOSING DOOR.

970,337.   Specification of Letters Patent.   Patented Sept. 13, 1910.

Application filed September 14, 1909. Serial No. 517,712.

*To all whom it may concern:*

Be it known that I, FRANK B. HOUSER, a citizen of the United States, residing at Lancaster, in the county of Fairfield and State of Ohio, have invented certain new and useful Improvements in Flush-Closing Doors; and I do hereby declare the following to be a full, clear, and exact description of the invention, such as will enable others skilled in the art to which it appertains to make and use the same.

My invention relates to that class of flush closing doors employed on cars, or as fire-doors for buildings, and in general on any structures where a flush closing door is deemed desirable.

It pertains more especially to that class wherein the door has a longitudinal movement into position before the doorway and a lateral movement into position to close the opening.

The object of my invention is the provision of an efficient means for supporting the door from its carriers or trolleys as well as effecting the lateral movement of the door with relation to its carriers or trolleys, said means so supported on or carried by the carrier or trolley as to avoid torsional strains on the connecting members, whereby durability of the structure as a whole as well as facility of movement of the door and co-acting members is obtained.

To this end the main feature of my invention embraces the combination with a door carrier, of a link door support pivotally connected with the carrier, and which rests upon and is bodily movable on the carrier between the pivotal connections of said link, whereby said link is relieved of torsional strains.

A second feature of my invention embraces the combination with a carrier having a horizontally disposed link support, of a plurality of horizontally disposed connected links forming a door support, said link door support movable upon and carried by the carrier between the pivotal points of said links.

There are other, minor, features of invention, embracing particular combinations and elemental features of construction, all as will hereinafter more fully appear.

In the drawings chosen for the purpose of illustrating my invention, the scope whereof is pointed out in the claims, Figure 1 is a side elevation of a portion of a box car provided with a flush closing door embodying my invention. Fig. 2 is a plan view of the trolley or carrier track attached to a car. Fig. 3 is an enlarged side elevation of the rear or follower carrier or trolley, with portions of the door, car and track. Fig. 4 is an enlarged side elevation of the front or leading carrier or trolley, with portions of the door, car and track. Fig. 5 is an end view of the rear or follower carrier or trolley showing its relation to the track and door. Fig. 6 is a sectional view of the rear or follower carrier or trolley and track, on the line 6—6, Fig. 3. Fig. 7 is a sectional view of the front or leading carrier or trolley on the line 7—7, Fig. 4. Fig. 8 is a horizontal section of the follower or rear carrier or trolley on the line 8—8, Fig. 3; and Fig. 9 is a horizontal section of the front or leading carrier or trolley on the line 9—9, Fig. 4.

Like symbols refer to like parts wherever they occur.

I will now proceed to describe my invention more fully so that others skilled in the art to which it appertains may apply the same.

In the drawings, A indicates the side of a box car, B a longitudinally and laterally movable door for closing the door way therein, C a track for the carriers, trolleys or hangers which carry the door, and D, E the carriers, trolleys or hangers whereby the door is suspended and moved longitudinally and laterally.

The track C if a trolley is the form of carrier or hanger employed is preferably composed of two rails 1, 1ª secured to the car, structure, or equivalent support in a horizontal plane above and parallel with the top rail or lintel of the door. Of said rails the inner one 1, may terminate slightly beyond and near to the door-post, while the other or outer rail 1ª, will curve inward from the termination of the first named rail, and extend across the door frame to constitute a guide for directing the leading or front end of the door into position between the sideposts or jambs of the doorway.

The carriers or hangers for suspending and moving the door longitudinally into and out of position in the doorway may be of any desired character, but are preferably in the form of trolleys or wheeled trucks, as requiring the exertion of less force in moving the door.

The leading or front trolley D is narrow to adapt it to traverse the single guide rail 1ª where it curves inward, and is preferably provided with two wheels 2, 2, arranged in line or tandem, and journaled in a suitable housing or hanger frame. From this trolley the forward end of the door B is suspended by means of a hinged strap or bracket 3, having a swivel connection 4 with the carrier D, whereby the inward canting of the leading end of the door required to enter it between the side posts is permitted while the trolley D is traversing the curved portion of the guide rail 1ª.

The front edge of the door B may be provided with a pin or peg $b$ adapted to enter an orifice in the door jamb to hold the door securely when closed.

The follower or rear trolley E, or that which carries the rear end of the door B, is preferably a four wheel truck adapted to traverse both track rails 1, 1ª. The truck of the trolley E is preferably comprised of two members 5, 5 of U-shape above as at 5ª, 5ª to constitute housings for the sheaves or wheels 2ª, 2ª and bent at right angles below, or projecting horizontally inward, as at 5ᵇ, to afford attachment for a connecting bar or plate 6 which unites the two members 5, 5 rigidly. To insure the rigidity of the truck a second connecting bar or plate 6ª extending between the members 5, 5 may be employed, and to this bar 6ª which is vertically disposed, a check piece 7, which projects under the track rail 1ª, may be secured to confine the trolley to the track rail 1ª. The horizontally disposed plate 6, or its equivalent, serves as the point of pivotal attachment for horizontally disposed links by means of which the rear end of the door B is suspended from the trolley E.

The door supports are each composed of two short links 8 and 9 which are pivotally connected with each other by means of a post 10 or its equivalent which will permit of the levers 8, 8 resting against and moving upon the under side of plate 6 to which they are pivotally connected as at 8ª while the links 9, 9 ride upon and are bodily supported between their pivotal points by the upper surfaces of the horizontal, inwardly projecting members 5ᵇ, 5ᵇ of the parts 5, 5 constituting the housings for the wheels 2ª, 2ª. The ends of the links 9, 9 opposite to their pivotal connections with the posts 10, are pivotally connected as at 11 with a hinged strap or bracket 12 connected with the rear end of the door B. It will be seen that by this arrangement of the links 8 and 9 any load carried by the links 9 will be transferred directly to the housings of the carrier, and the links and their connections will be supported against torsional strains.

The construction and combination of the devices being substantially such as hereinbefore set forth, their operation will be as follows. Assuming the door to be closed as indicated in Fig. 1 of the drawing, the members 8 and 9 of the links will occupy the relative position shown in full lines in Fig. 8 of the drawings. If now the rear end of the door is withdrawn from between the door jambs, the front end of the door will swivel on its carrier D, and the links 8 and 9 will assume the position shown in dotted lines Fig. 8 which will permit the door to be moved longitudinally from in front of the doorway, during which movement the carrier D will traverse the curved guide rail 1ª the swivel connection between the carrier and door at the front end permitting the door to accommodate itself to the changing relations of truck and door caused by the movement of the truck. When it is desired to again close the door a reverse longitudinal movement is imparted to it, and the leading trolley D traversing the curved portion of guide track 1ª will direct the front edge of the door into position within the door post. By the time the front edge of the door has engaged the door post the rear edge of the door will be in line with the inner edge of the corresponding door-post, whereupon the lateral movement of the door into position between the door-posts and flush is effected by the links 8 and 9 resuming the position shown in full lines Fig. 8, which can be effected by a slight lateral pressure on the rear end of the door.

Having thus described my invention, what I claim and desire to secure by Letters Patent is:

1. The combination with a door carrier, of a pivoted link forming a door support which is bodily movable on and supported by the carrier between the pivotal points of the link.

2. The combination with a door carrier having a horizontally disposed link support, of a plurality of links forming a door support bodily movable on and supported by the horizontal link support of the carrier.

3. The combination with a door carrier having a horizontally disposed link support, of a plurality of pivotally connected links some of said links being directly and pivotally connected with the carrier and other of said links resting upon and being bodily movable on the horizontally disposed link support of the carrier.

4. The combination with a door, of a plurality of door carriers, one of said carriers having a swivel connection with the door, and the other of said carriers having a horizontally disposed pivoted link connection with the door, said link connection resting upon and bodily movable on the carrier, and a carrier track having a rail which curves inward and constitutes a guide rail.

In testimony whereof I affix my signature, in presence of two subscribing witnesses.

FRANK B. HOUSER.

Witnesses:
S. SHUPE,
W. K. MARTIN.